(12) United States Patent
Kitazume

(10) Patent No.: US 9,821,837 B2
(45) Date of Patent: Nov. 21, 2017

(54) ELECTRIC POWER STEERING APPARATUS

(71) Applicant: NSK Ltd., Tokyo (JP)

(72) Inventor: Tetsuya Kitazume, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 14/913,763

(22) PCT Filed: May 13, 2015

(86) PCT No.: PCT/JP2015/063815
§ 371 (c)(1),
(2) Date: Feb. 23, 2016

(87) PCT Pub. No.: WO2016/017235
PCT Pub. Date: Feb. 4, 2016

(65) Prior Publication Data
US 2017/0183028 A1  Jun. 29, 2017

(30) Foreign Application Priority Data

Jul. 31, 2014  (JP) .................. 2014-156257

(51) Int. Cl.
*B62D 5/04* (2006.01)
*B62D 6/00* (2006.01)

(52) U.S. Cl.
CPC ............. *B62D 5/0466* (2013.01); *B62D 6/00* (2013.01)

(58) Field of Classification Search
CPC .................. B62D 5/0466; B62D 6/00
See application file for complete search history.

(56) References Cited

U.S. PATENT DOCUMENTS

| 5,740,040 | A  | * | 4/1998 | Kifuku | B62D 5/0463 180/446 |
| 6,445,987 | B1 | * | 9/2002 | Kurishige | B62D 5/0466 180/410 |
| 2002/0026267 | A1 | * | 2/2002 | Kifuku | B62D 5/0466 701/41 |
| 2004/0133321 | A1 | * | 7/2004 | Ghoneim | B60G 17/0195 701/41 |
| 2009/0192679 | A1 | * | 7/2009 | Kobayashi | B62D 5/0463 701/42 |

(Continued)

FOREIGN PATENT DOCUMENTS

JP  2007-099053 A1  4/2007
JP  2007-296900 A   11/2007

(Continued)

OTHER PUBLICATIONS

International Search Report for PCT/JP2015/063815 dated Aug. 4, 2015 [PCT/ISA/210].

(Continued)

*Primary Examiner* — Rodney Butler
*Assistant Examiner* — Frederick Brushaber
(74) *Attorney, Agent, or Firm* — Sughrue Mion, PLLC

(57) ABSTRACT

An electric power steering apparatus including a steering wheel return control section that calculates a steering wheel return control current by a steering angle, the steering torque, the vehicle speed and a steering angle velocity, and drives the motor by a compensation current command value made by adding the steering wheel return control current to the current command value.

20 Claims, 8 Drawing Sheets

(56) References Cited

U.S. PATENT DOCUMENTS

| | | | |
|---|---|---|---|
| 2009/0271069 A1 | 10/2009 | Yamamoto et al. | |
| 2010/0168963 A1* | 7/2010 | Yamamoto | B62D 5/0463 701/42 |
| 2012/0041645 A1* | 2/2012 | Benyo | B62D 5/0466 701/42 |
| 2013/0060413 A1* | 3/2013 | Lee | B62D 1/286 701/23 |
| 2013/0060414 A1* | 3/2013 | Lee | B62D 1/286 701/23 |
| 2014/0019008 A1* | 1/2014 | Nakamura | B62D 6/008 701/42 |
| 2014/0129089 A1 | 5/2014 | Takeuchi et al. | |

FOREIGN PATENT DOCUMENTS

| | | |
|---|---|---|
| JP | 2009-061977 A | 3/2009 |
| JP | 4685557 B2 | 5/2011 |
| JP | 2013-014271 A | 1/2013 |

OTHER PUBLICATIONS

Written Opinion for PCT/JP2015/063815 dated Aug. 4, 2015 [PCT/ISA/237].

* cited by examiner

PRIOR ART

ELECTRIC POWER STEERING APPARATUS

CROSS REFERENCE TO RELATED APPLICATIONS

This application is a National Stage of International Application No. PCT/JP2015/063815 filed May 13, 2015, claiming priority based on Japanese Patent Application No. 2014-156257 filed Jul. 31, 2014, the contents of all of which are incorporated herein by reference in their entirety.

TECHNICAL FIELD

The present invention relates to an electric power steering apparatus that performs PWM-control of a motor by means of an inverter circuit based on a current command value and provides a steering system with an assist torque, and in particular to a highly reliable electric power steering apparatus that positively returns a steering wheel to a neutral position in such a running state as to return to a going straight state by making a correction by a steering wheel return control current corresponding to a steering angle and improves a function of steering wheel return control.

BACKGROUND ART

An electric power steering apparatus which provides a steering mechanism of a vehicle with an assist torque by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus (EPS) performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of duty command values of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque T of the steering wheel 1 and a steering angle sensor 14 for detecting a steering angle θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command on the basis of a steering torque T detected by the torque sensor 10 and a vehicle speed V detected by a vehicle speed sensor 12, and controls a current supplied to the motor 20 on the basis of a voltage control command value Vref obtained by performing compensation or the like with respect to the current command value. The steering angle sensor 14 is not essential and it does not need to be provided.

A controller area network (CAN) 50 exchanging various information of a vehicle is connected to the control unit 30, and it is possible to receive the vehicle speed V from the CAN 50. Further, it is also possible to connect a non-CAN 51 exchanging a communication, analog/digital signals, a radio wave or the like except with the CAN to the control unit 30.

The control unit 30 mainly comprises a CPU (also including an MCU, an MPU or the like), and general functions performed by programs within the CPU are shown in FIG. 2.

Functions and operations of the control unit 30 will be described with reference to FIG. 2. As shown in FIG. 2, the steering torque T detected by the torque sensor 10 and the vehicle speed V detected by the vehicle speed sensor 12 (or sent from the CAN 50) are inputted into a current command value calculating section 31 for calculating a current command value Iref1. The current command value calculating section 31 calculates the current command value Iref1 that is a control target value of a current supplied to the motor 20 based on the steering torque T being inputted and the vehicle speed V being inputted and by means of an assist map or the like. The current command value Iref1 is inputted into a current limiting section 33 through an adding section 32A. A current command value Irefm of which a maximum current is limited is inputted into a subtracting section 32B, and a deviation I (Irefm-Im) between the current command value Irefm and a motor current value Im being fed back is calculated. The deviation I is inputted into a PI control section 35 for characteristic improvement of steering operations. A voltage control command value Vref of which the characteristic is improved by the PI control section 35 is inputted into a PWM control section 36. Furthermore, the motor 20 is PWM-driven through an inverter circuit 37 serving as a driving section. The current value Im of the motor 20 is detected by a motor current detector 38 and fed back to the subtracting section 32B. The inverter circuit 37 uses FETs as driving elements and is comprised of a bridge circuit of FETs.

A compensation signal CM from a compensation signal generating section 34 is added in the adding section 32A, and characteristic compensation of the steering system is performed by the addition of the compensation signal CM so as to improve a convergence, an inertia characteristic or the like. The compensation signal generating section 34 adds a self-aligning torque (SAT) 343 and an inertia 342 in an adding section 344, further, adds the result of addition performed in the adding section 344 and a convergence 341 in an adding section 345, and then outputs the result of addition performed in the adding section 345 as the compensation signal CM.

In such the electric power steering apparatus, friction made by the reduction gears and the rack-and-pinion mechanism is large, and an equivalent inertia moment around the steering shaft is large because of the motor for generating the assist torque. Therefore, a steering wheel return worsens because the friction is large in a low vehicle speed range where a self-aligning torque (SAT) is small. This causes a load of a driver, because a steering angle does not return to a neutral position in a going straight state by means of the only SAT, so that it is necessary to return the steering angle to the neutral position by steering intervention of the driver.

On the other hand, the SAT is large in a high vehicle speed range, so that a steering angle velocity tends to increase in the high vehicle speed range compared with the low vehicle speed range. However, because an inertia moment is large in the high vehicle speed range, an inertia torque is also large, so that the steering wheel does not converge at the neutral position of the steering angle, and overshoots the neutral position. This causes the driver to feel a vehicle characteristic unstable.

Accordingly, it is necessary to increase the convergence to assist the steering wheel return in the low vehicle speed range and make the vehicle characteristic stable in the high vehicle speed range. Various control methods for moderately assisting at the time of the steering wheel return have been proposed to achieve them. In the control methods of the steering wheel return, there is an electric power steering apparatus shown in the publication of Japanese Patent No. 4685557 B2 (Patent Document 1) as a prior art for controlling the steering wheel return smoothly even if the driver intervenes in steering.

The apparatus shown in Patent Document 1 calculates a target steering angle velocity by correcting a base-target steering angle velocity with multiplication and addition using a vehicle speed and a torque in a controller that is configured so as to follow the target steering angle velocity. When the driver intervenes in steering, the apparatus decreases an uncomfortable feeling in driver's steering by correcting the target steering angle velocity in the direction where the torque is added.

THE LIST OF PRIOR ART DOCUMENTS

Patent Documents

Patent Document 1: Japanese Patent No. 4685557 B2

SUMMARY OF THE INVENTION

Problems to be Solved by the Invention

A steering angular acceleration should not fluctuate largely and a steering angle velocity should become 0 at a neutral position of a steering angle to realize a smooth steering wheel return in a hand-off state. However, it is necessary for the apparatus described in Patent Document 1 to set a quantity and a curvature of the target steering angle velocity in advance so as to realize a natural steering wheel return when setting the target steering angle velocity, so that there is a problem that it takes time to set the target steering angle velocity not causing the uncomfortable feeling, or that the apparatus imposes the load on the driver because moderate setting cannot be done.

The present invention has been developed in view of the above-described circumstances, and the object of the present invention is to provide an electric power steering apparatus that is capable of realizing a smooth steering wheel return without the uncomfortable feeling even if the driver intervenes in steering in a going straight state.

Means for Solving the Problems

The present invention relates to an electric power steering apparatus that calculates a current command value based on a steering torque and a vehicle speed, drives a motor based on said current command value, and performs assist control of a steering system by drive-control of said motor, the above-described object of the present invention is achieved by that comprising: a steering wheel return control section that calculates a steering wheel return control current by a steering angle, said steering torque, said vehicle speed and a steering angle velocity, and drives said motor by a compensation current command value made by adding said steering wheel return control current to said current command value, wherein said steering wheel return control section comprises an angular acceleration calculating section that calculates an angular acceleration corresponding to said steering angle, said vehicle speed and said steering torque, a correcting section that corrects a double integral value of said angular acceleration by a square of an angle velocity corresponding to said steering torque, a target steering angle velocity setting section that sets a target steering angle velocity based on a square root of a correction value from said correcting section, a steering wheel return control gain calculating section that calculates a steering wheel return control gain by multiplying a deviation between said target steering angle velocity and an actual steering angle velocity by a vehicle speed gain and a steering torque gain, and a steering wheel return control current calculating section that performs at least one control calculation among a P-control calculation, an I-control calculation and a D-control calculation to said steering wheel return control gain, and calculates said steering wheel return control gain that is limited by means of said vehicle speed gain and said steering torque gain.

Further, the above-described object of the present invention is more effectively achieved by that wherein said angular acceleration calculating section has a characteristic that said angular acceleration gradually decreases as said steering angle becomes larger using said vehicle speed as a parameter; or wherein said angular acceleration has a characteristic of decreasing as said vehicle speed becomes smaller; or wherein said steering torque gain has a characteristic of being fixed until said steering torque is a predetermined value T1, gradually decreasing while said steering torque is larger than or equal to a predetermined value T2 (>said predetermined value T1) and smaller than or equal to a predetermined value T3 (>said predetermined value T2), and becoming 0 when said steering torque is larger than or equal to said predetermined value T3; or wherein said vehicle speed gain has a characteristic of being fixed until said vehicle speed is a predetermined value V1, gradually increasing while said vehicle speed is larger than or equal to a predetermined value V2 (>said predetermined value V1) and smaller than or equal to a predetermined value V3 (>said predetermined value V2), and becoming a fixed value when said vehicle speed is larger than or equal to said predetermined value V3; or wherein subtraction of said steering angle velocity through a phase advance filter from said target steering angle velocity is performed; or wherein a maximum value of said steering wheel return control current is limited by a limiter; or wherein the P-control calculation and the I-control calculation are performed to said steering wheel return control gain.

Effects of the Invention

The electric power steering apparatus of the present invention generates an angular acceleration by a steering torque added to a column shaft depending on physical characteristics, and performs a feedback control after setting a target angular acceleration depending on a vehicle characteristic that a driver desires. Thus it is possible to bring the vehicle characteristic close to the desired characteristic even if the vehicle characteristic is undesirable for the driver because of including friction or the like.

The present invention subtracts a square of a target steering angle velocity correction value corresponding to the steering torque from a double value of the value calculated by integrating the target angular acceleration corresponding to a steering angle, a vehicle speed and the steering torque from a current steering angle to 0, makes a square root of the subtraction value to be the target steering angle velocity, and performs at least one control among PWM controls to a deviation between the target steering angle velocity and an actual steering angle velocity. In this way, it is possible to realize the electric power steering apparatus that returns the steering angle to a neutral position smoothly and surely in a going straight state by performing feedback control where the angular acceleration obtained when an ideal road-surface reaction force, a system friction or the like occurs at the column shaft is a target.

MODE FOR CARRYING OUT THE INVENTION

Figure 1:
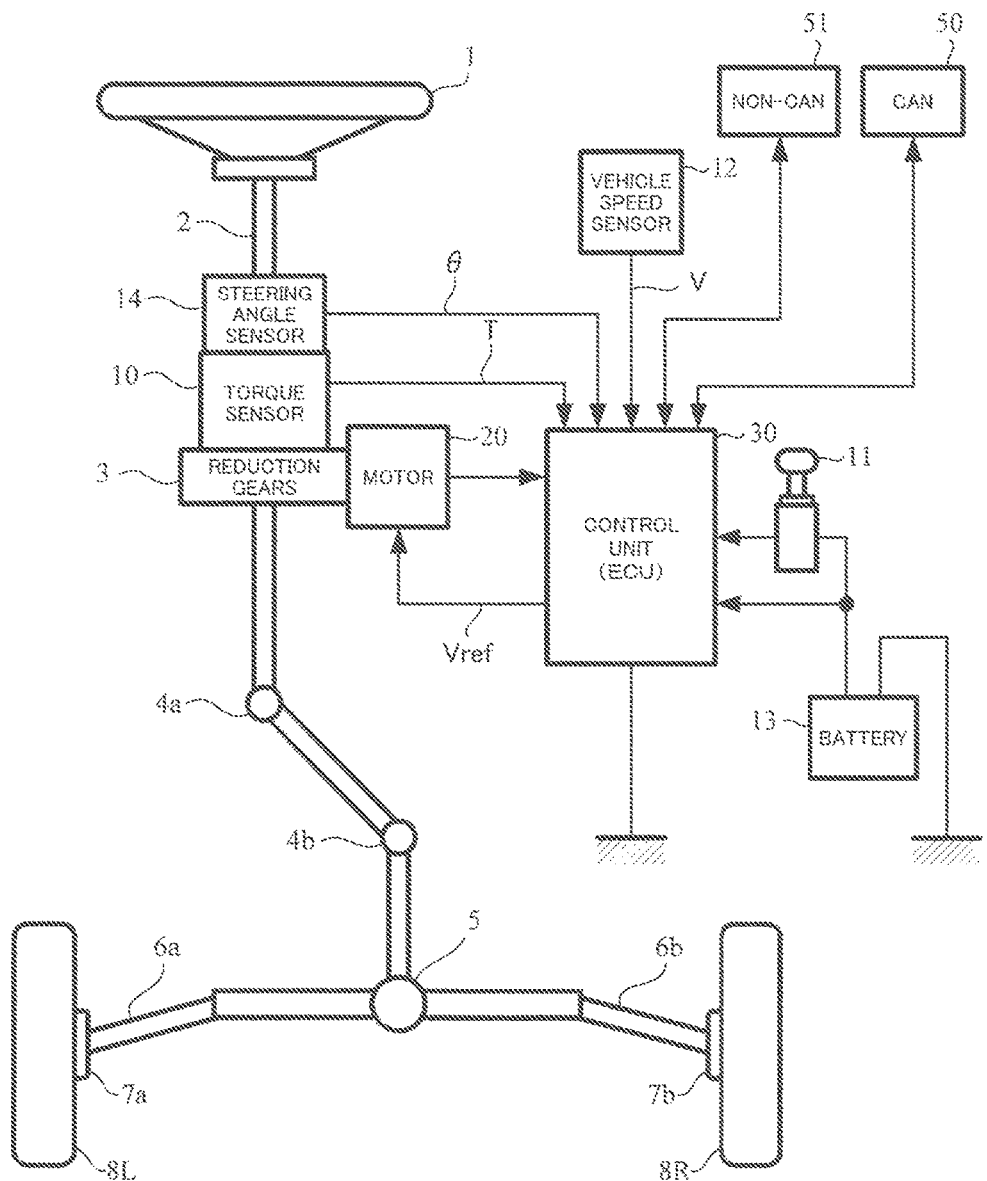
FIG. 1 is a configuration diagram illustrating a general outline of an electric power steering apparatus.
Figure 2:
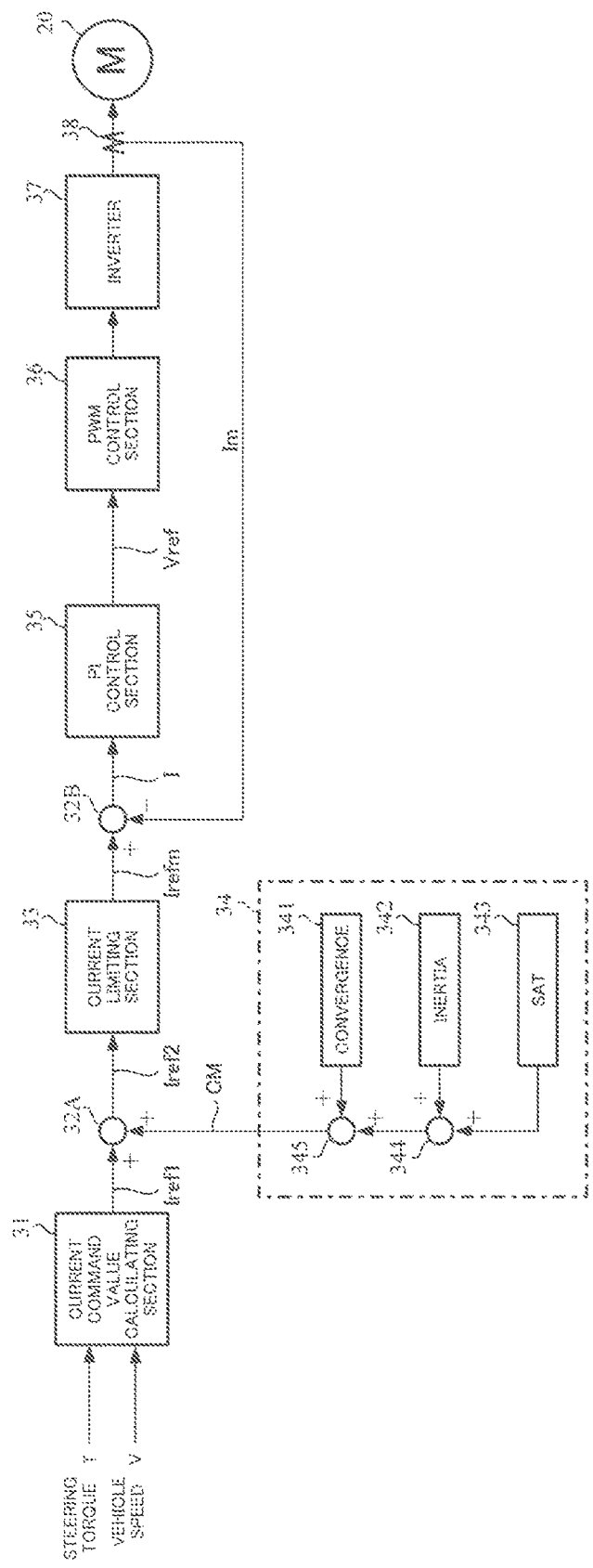
FIG. 2 is a block diagram showing a configuration example of a control system of the electric power steering apparatus.

In an electric power steering apparatus, it may be difficult that a vehicle becomes a going straight state because an action of the apparatus is inhibited by friction of reduction gears and a rack-and-pinion mechanism for transmitting an assist torque and a steering wheel does not return to a neutral position in spite of the running state where a driver wants to return the steering wheel to a going straight state. Consequently, it is possible to positively return the steering wheel to the neutral position in such a running state as to return to the going straight state by correcting (compensating) a current command value by a steering wheel return control current corresponding to a steering angle.

The present invention subtracts a square of a target steering angle velocity correction value corresponding to a steering torque from a double value of the value calculated by integrating a target angular acceleration corresponding to the steering angle, a vehicle speed and the steering torque that is added to a column shaft from a current steering angle to 0, and makes a square root of the subtraction value to be a target steering angle velocity. The present invention performs at least one control among a proportional (P) control, an integral (I) control and a differential (D) control to a deviation between the target steering angle velocity and an actual steering angle velocity (in some cases, which has gone through a phase advance filter). Thus, the present invention realizes the electric power steering apparatus that returns the steering wheel to the neutral position in a smooth manner and in the going straight state by performing feedback control where an angular acceleration obtained when an ideal road-surface reaction force, a system friction or the like occurs at the column shaft is a target.

In this case, with respect to the relation between a steering angle θ and a steering angle velocity ω, the following Expression 1 holds because the steering angle velocity ω is a time-differential of the steering angle θ.

$$\omega = \frac{d\theta}{dt} \quad \text{[Expression 1]}$$

The following Expression 2 holds by the above Expression 1.

$$dt = \frac{1}{\omega} d\theta \quad \text{[Expression 2]}$$

As an angular acceleration α is a time-differential of the steering angle velocity ω, the following Expression 3 holds.

$$\alpha = \frac{d\omega}{dt} \quad \text{[Expression 3]}$$

Then the following Expression 4 holds.

$$dt = \frac{1}{\alpha} d\omega \quad \text{[Expression 4]}$$

In this case, the following Expression 5 holds by the above Expression 2 and 4.

$$\frac{1}{\omega} d\theta = \frac{1}{\alpha} d\omega \quad \text{[Expression 5]}$$

Thus the following Expression 6 holds.

$$\alpha d\theta = \omega d\omega \quad \text{[Expression 6]}$$

From the above Expression 6, the case that the steering angle velocity ω changes from $\omega_1$ to 0 with the angular acceleration α corresponding to the steering angle θ and a vehicle speed V while the steering angle θ changes from θ1 to 0 is expressed by the following integral Expression 7.

$$\int_0^{\theta_1} \alpha(\theta, V) d\theta = \int_0^{\omega_1} \omega d\omega$$

$$\int_0^{\theta_1} \alpha(\theta, V) d\theta = [½\omega^2]_0^{\omega_1}$$

$$\int_0^{\theta_1} \alpha(\theta, V) d\theta = ½\omega_1^2 \quad \text{[Expression 7]}$$

Accordingly, the following Expression 8 holds, and the steering angle velocity $\omega_1$ is expressed by the following Expression 9.

$$\omega_1^2 = 2\int_0^{\theta_1} \alpha(\theta, V) d\theta \quad \text{[Expression 8]}$$

$$\omega_1 = \pm\sqrt{|2\int_0^{\theta_1} \alpha(\theta, V) d\theta|} \quad \text{[Expression 9]}$$

The steering angle velocity $\omega_1$ is considered as a target steering angle velocity in a state of a steering torque T=0 (with no hands) because these expressions do not include the steering torque T caused by a driver.

Figure 3A:
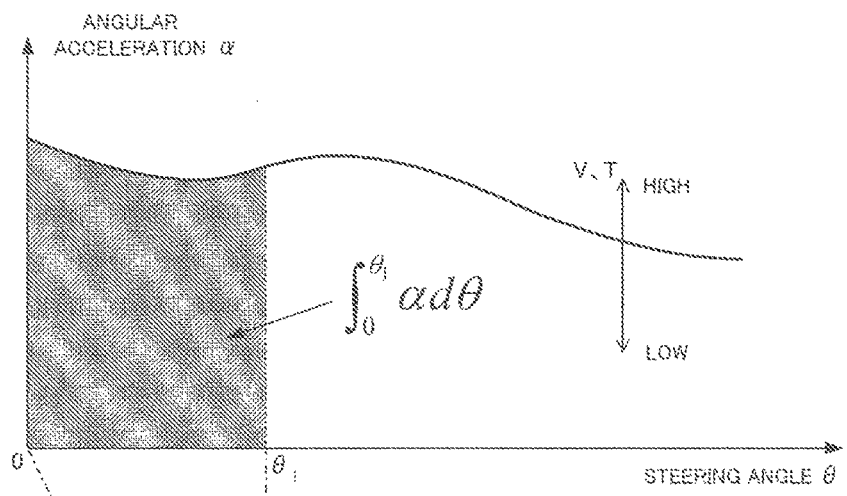
FIGS. 3A and 3B are diagrams for describing a principle of the present invention.
Figure 3B:
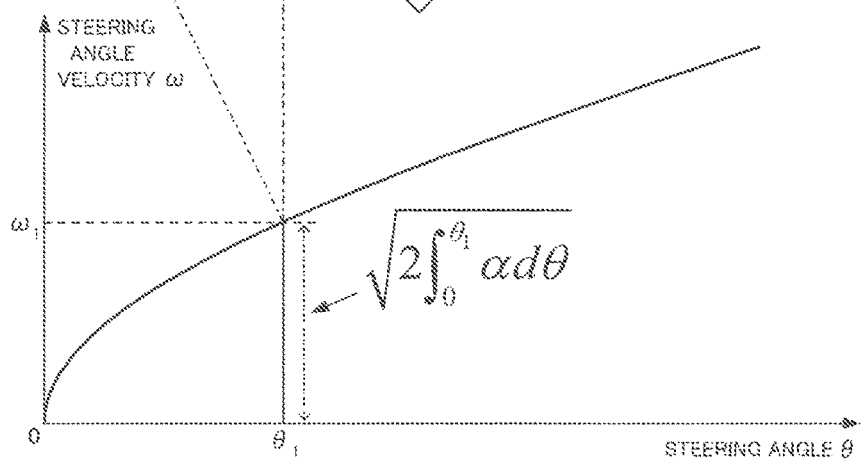

As shown in FIGS. 3A and 3B, setting the steering angle velocity $\omega_1$ as the target steering angle velocity makes a steering wheel return with the angular acceleration α derived from the steering angle θ and the vehicle speed V.

On the other hand, when the driver steers the steering wheel, the steering wheel is to move even at the steering angle θ=0 with a steering angle velocity $\omega_0$ whose direction is where the steering torque T is added. Moreover, the angular acceleration α becomes a function of the steering angle θ, the vehicle speed V and the steering torque T as shown in FIG. 3A because the angular acceleration α changes depending on the steering torque T. In this case, the following Expression 10 holds when the steering angle velocity at the steering angle θ=0 occurring by the steering torque T is $\omega_0$.

$\int_0^{\theta_1} \alpha(\theta, V, T) d\theta = \int_{\omega_0}^{\omega_1} \omega d\omega$ $\int_0^{\theta_1} \alpha(\theta, V, T) d\theta = [\frac{1}{2}\omega^2]_{\omega_0}^{\omega_1}$ $\int_0^{\theta_1} \alpha(\theta, V, T) d\theta = \frac{1}{2}\omega_1^2 - \frac{1}{2}\omega_0^2$  [Expression 10]

Accordingly, the following Expression 11 is obtained, and the steering angle velocity $\omega_1$ is expressed by Expression 12.

$\omega_1^2 = 2\int_0^{\theta_1} \alpha(\theta, V, T) d\theta + \omega_0^2$  [Expression 11]

$\omega_1 = \pm\sqrt{|2\int_0^{\theta_1} \alpha(\theta, V, T) d\theta + \omega_0^2|}$  [Expression 12]

The steering angle velocity $\omega_0$ from Expression 10 to Expression 12 is the value set as the target steering angle velocity at θ=0 when the steering torque T is added, FIG. 3B shows the characteristic when $\omega_0$=0, and the characteristic value fluctuates depending on the steering torque when the steering angle velocity $\omega_0$ occurs.

Setting the steering angle velocity $\omega_1$ as the target steering angle velocity and changing the steering angle velocity $\omega_0$ and the angular acceleration α depending on the steering torque T make the steering wheel return with the angular acceleration derived from the steering angle θ and the vehicle speed V. The present invention uses a vehicle speed gain KP to multiply corresponding to the vehicle speed V because return performance of the steering wheel and convergence of the vehicle vary by the vehicle speed V. Further, the steering wheel return control is mainly necessary when the steering torque T added to the column shaft is small and an influence of a friction torque is relatively large. Therefore, the steering wheel return control needs no large output when the steering torque T is large. Consequently, a steering torque gain Th that decreases depending on the steering torque T is multiplied.

It is possible to realize the smooth steering wheel return control by setting the steering angle velocity $\omega_1$ as the target steering angle velocity and performing control depending on a deviation between the target steering angle velocity $\omega_1$ and an actual steering angle velocity ω. It is also possible to provide the steering wheel return control without uncomfortable feeling even when a driver intervenes in steering.

Hereinafter, an embodiment of the present invention will be described in detail with reference to the accompanying drawings.

Figure 4:
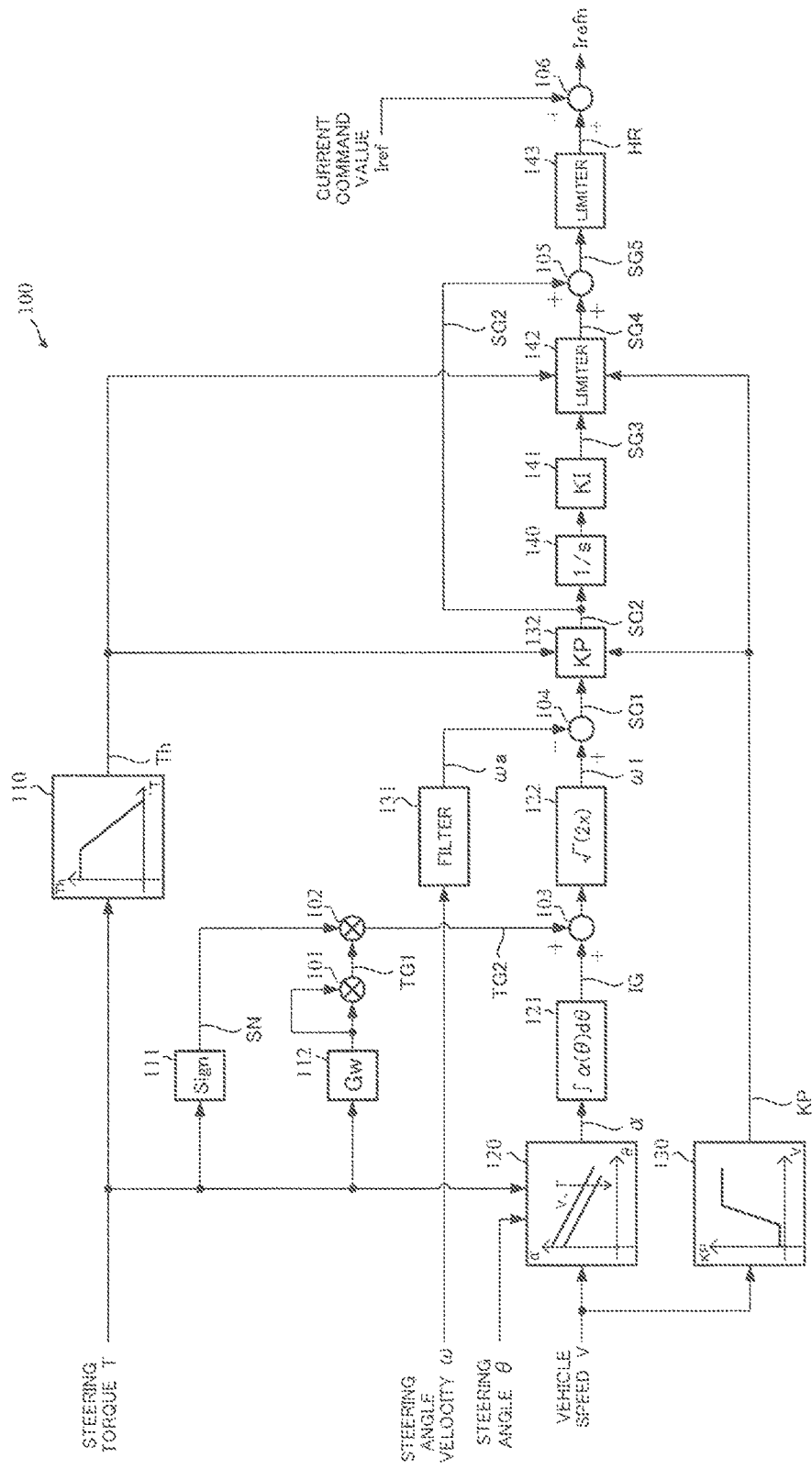
FIG. 4 is a block diagram showing a configuration example of the present invention.

FIG. 4 is a block diagram showing a configuration example of a steering wheel return control section 100 according to the present invention. The steering torque T is inputted into a steering torque gain section 110 that outputs the steering torque gain Th, a sign detecting section 111 that detects a sign (direction) of the steering torque T, a gain section 112 that multiplies by a gain Gw, and an angular acceleration calculating section 120 that calculates the angular acceleration α. The vehicle speed V is inputted into the angular acceleration calculating section 120 and a vehicle speed gain section 130 that outputs the vehicle speed gain KP. Further, the steering angle θ is inputted into the angular acceleration calculating section 120, and the steering angle velocity ω is inputted into a filter 131. If the steering angle velocity ω has enough responsiveness, the filter 131 is unnecessary because of being used as phase advance.

The angular acceleration α that is calculated in the angular acceleration calculating section 120 based on the steering angle θ, the vehicle speed V and the steering torque T is integrated in an integrating section 121, and the integral value IG is inputted into an adding section 103. The steering torque that is multiplied by the gain Gw in the gain section 112 is squared in a multiplying section 101, and the square value TG1, which is inputted into a multiplying section 102, is multiplied by a sign SN (a positive or a negative) outputted from the sign detecting section 111. The multiplication result TG2 is inputted into the adding section 103. Correcting the target angular acceleration α depending on the steering torque T has been brake measures in returning a steering wheel. The steering wheel return control section 100 corrects the angular acceleration α by the steering torque T, and corrects the integral value by the square value TG1 corresponding to the steering torque T. The integral of the integrating section 121 compensates a low torque that is easy to be influenced by friction, and particularly has an effect to exercise its function better in a range where it is influenced by friction with no hands.

An addition result of the adding section 103 is inputted into a square root section 122, the square root section 122 performs square root calculation according to Expression 11 and Expression 12, and outputs the target steering angle velocity $\omega_1$. The steering angle velocity $\omega_1$ is addition-inputted into a subtracting section 104. An actual steering angle velocity ωa outputted from the filter 131 has been subtraction-inputted into the subtracting section 104, and a deviation SG1, which is the subtraction result, between the target steering angle velocity $\omega_1$ and the actual steering angle velocity ωa is inputted into a multiplying section 132.

Further, the steering torque gain Th outputted from the steering torque gain section 110 is inputted into the multiplying section 132 and a limiter 142, and the vehicle speed gain KP outputted from the vehicle speed gain section 130 is also inputted into the multiplying section 132 and the limiter 142. The multiplying section 132 outputs a steering wheel return control gain SG2 that enables a feedback gain to change depending on the vehicle speed gain KP from the vehicle speed gain section 130 and the steering torque gain Th. In other words, the configuration makes the target steering angle velocity $\omega_1$ fast but the torque small at slow vehicle speed, and makes the target steering angle velocity $\omega_1$ slow but the torque large at fast vehicle speed.

The steering wheel return control gain SG2 that is the multiplication result of the multiplying section 132 is inputted into an adding section 105, at the same time, is inputted into an integral control section 140 for characteristic improvement, and is inputted into the limiter 142 through an integral gain (KI) section 141. A signal SG4 that is limited in the limiter 142 is added in the adding section 105 to the steering wheel return control gain SG2 that is the multiplication result, and the addition result SG5 is outputted as a steering wheel return control current HR through a limiter 143. The present example uses the integral control as control calculation, but it is enough to use at least one control calculation among proportion (P), integral (I) and differential (D), and it is possible to use any combination.

The steering wheel return control current HR is added in an adding section 106 to a current command value Iref, and is inputted into a motor driving system as a compensated compensation current command value Irefn. Moreover, the limiter 143 limits a maximum value of the steering wheel return control current HR, and it is possible to remove the limiter 143.

A correcting section comprises the integrating section 121, the adding section 103, the sign detecting section 111, the gain section 112, the multiplying section 101 and 102. A steering wheel return control gain calculating section comprises the steering torque gain section 110, the vehicle speed gain section 130 and the multiplying section 132. A steering wheel return control current calculating section comprises the integrating section 140, the integral gain section 141, the limiter 142, the adding section 105 and the limiter 143.

Figure 5:
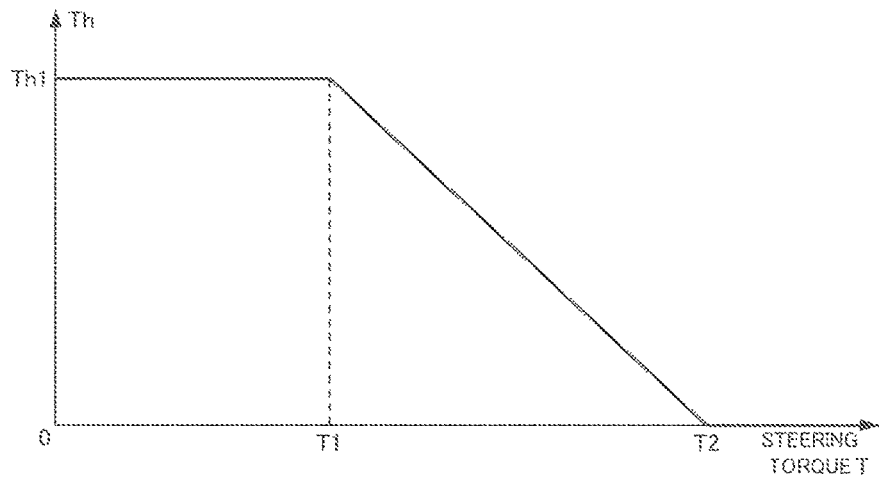
FIG. 5 is a characteristic diagram showing an output example of a steering torque gain section.
Figure 6:
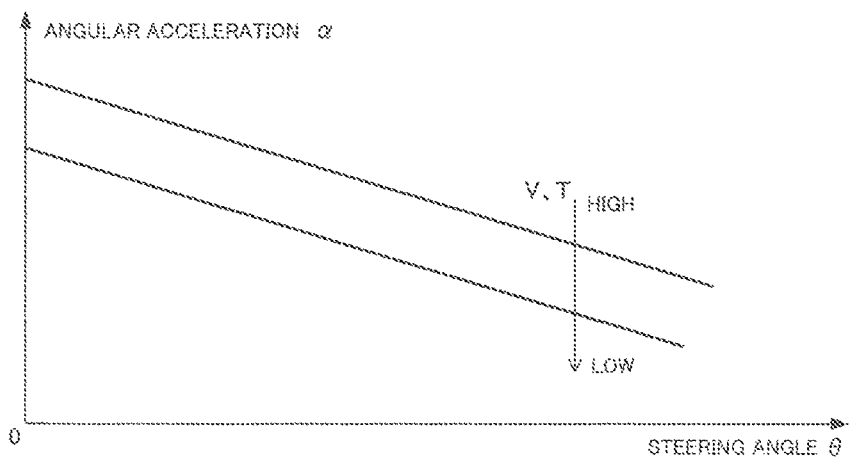
FIG. 6 is a characteristic diagram showing an output example of an angular acceleration calculating section.
Figure 7:
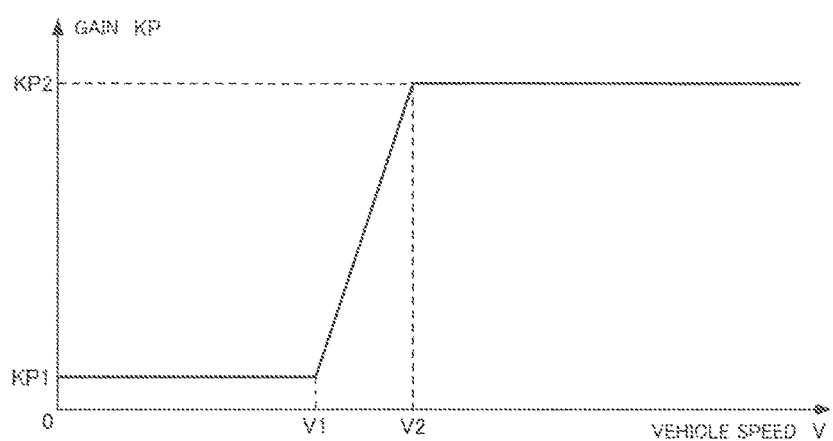
FIG. 7 is a characteristic diagram showing an output example of a vehicle speed gain section.

The steering torque gain section 110 has a characteristic as shown in FIG. 5. The characteristic is an output characteristic of outputting a fixed value Th1 while the steering torque T is from 0 to T1, gradually decrease after the T exceeds T1, and become 0 when the T is larger than or equal to T2 (>T1). Further, the angular acceleration calculating section 120 has an output characteristic of gradually decreasing as the steering angle θ becomes larger, and the characteristic that includes the vehicle speed V and the steering torque T as parameters is that the smaller the vehicle speed V and the steering torque T become, the smaller the angular acceleration α becomes. The vehicle speed gain section 130 has a characteristic as shown in FIG. 7. The gain KP is a small gain KP1 and fixed until the vehicle speed V becomes at least a vehicle speed V1, gradually increases when the vehicle speed V is larger than or equal to the vehicle speed V1, and is a large gain KP2 and fixed when the vehicle speed V is larger than or equal to a vehicle speed V2 (>V1). However, its characteristic is not limited to such a characteristic.

Figure 8:
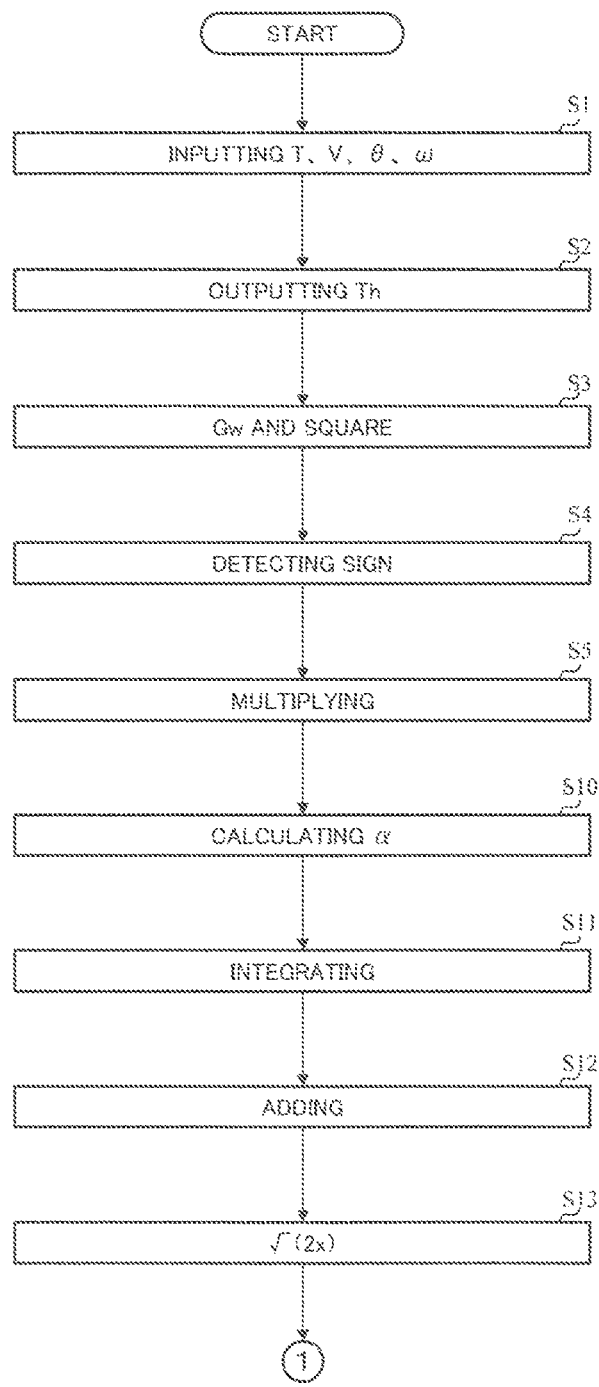
FIG. 8 is a part of a flowchart showing an operating example of the present invention.
Figure 9:
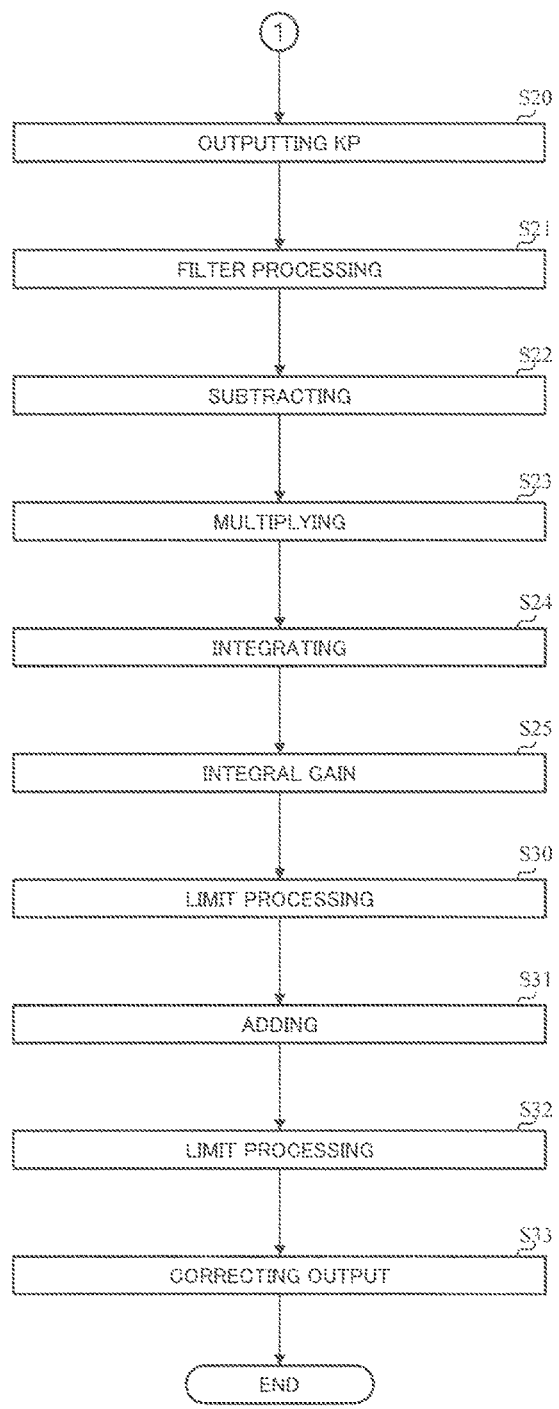
FIG. 9 is a part of the flowchart showing the operating example of the present invention.

An operation example of such a configuration will be described with reference to flowcharts shown in FIG. 8 and FIG. 9.

First, the steering wheel return control section 100 inputs (reads) the steering torque T, the vehicle speed V, the steering angle θ and the steering angle velocity ω (Step S1). The steering torque gain section 110 outputs the steering torque gain Th (Step S2). The gain section 112 multiplies the steering torque T by the gain Gw, the multiplying section 101 squares the multiplication result, and the multiplying section 102 inputs the square value (Step S3). The sign detecting section 111 detects the sign SN of the steering torque T (Step S4). The multiplying section 102 multiplies the square value by the sign SN (Step S5).

Further, the angular acceleration calculating section 120 calculates the angular acceleration abased on the steering angle θ, the vehicle speed V and the steering torque T that have been inputted (Step S10). The integrating section 121 integrates the angular acceleration α (Step S11). The adding section 103 adds the multiplication result of the multiplying section 102 to the integral value (Step S12). The square root section 122 performs square root calculation of the addition result, and outputs the target steering angle velocity $\omega_1$ (Step S13).

On the other hand, the vehicle speed V is transformed to the vehicle speed gain KP in the vehicle speed gain section 130 (Step S20). The actual steering angle velocity ω is performed phase advance processing in the filter 131, and is subtraction-inputted into the subtracting section 104 (Step S21). The deviation SG1, which is calculated in the subtracting section 104, between the actual steering angle velocity ω and the target steering angle velocity $\omega_1$ is inputted into the multiplying section 132 (Step S22). The steering torque gain Th and the vehicle speed gain KP have been inputted into the multiplying section 132, and the steering wheel return control gain SG2 is calculated by multiplying them (Step S23). The steering wheel return control gain SG2 is integrated in the integral control section 140 (Step S24), moreover, is multiplied by the integral gain KI in the integral gain section 141 (Step S25), and is limited in the limiter 142 depending on the steering torque gain Th and the vehicle speed gain KP (Step S30).

The signal that is limited in the limiter 142 is inputted into the adding section 105, is added to the steering wheel return control gain SG2 (Step S31), is limited in the limiter 143, and the limiter 143 outputs the steering wheel return control current HR (Step S32). The adding section 106 corrects the current command value Iref by adding the steering wheel return control current HR, and outputs the compensation current command value Irefn (Step S33).

Moreover, the steering angle velocity may be a product of a motor angle velocity and a gear ratio, and a square root function may be calculated by referring to a square root function table. Further, it is possible to suitably change turns of data input, calculations and processes in FIG. 8 and FIG. 9. Furthermore, the above embodiment performs I-control calculation to the steering wheel return control gain, but it is possible to perform all of P-control calculation, I-control calculation and D-control calculation, and it is enough to perform at least one control calculation among PID.

EXPLANATION OF REFERENCE NUMERALS 1 steering wheel
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
35 PI control section
36 PWM control section
37 inverter circuit
50 CAN
100 steering wheel return control section
110 steering torque gain section
111 sign detecting section
120 angular acceleration calculating section
121 integrating section
122 square root section
130 vehicle speed gain section
131 filter
140 integral control section
142, 143 limiter

The invention claimed is:

1. An electric power steering apparatus that calculates a current command value based on a steering torque and a vehicle speed, drives a motor based on said current command value, and performs assist control of a steering system by drive-control of said motor, comprising:
 a control unit comprising a CPU that calculates a steering wheel return control current by a steering angle, said steering torque, said vehicle speed and a steering angle velocity, and drives said motor by a compensation current command value made by adding said steering wheel return control current to said current command value, wherein said CPU calculates an angular acceleration corresponding to said steering angle, calculates a correction value that a double integral value of said angular acceleration is corrected by a square of an angle velocity corresponding to said steering torque, sets a target steering angle velocity based on a square root of said correction value, calculates a steering wheel return control gain by multiplying a deviation between said target steering angle velocity and an actual steering angle velocity by a vehicle speed gain and a steering torque gain, and performs at least one control calculation among a P-control calculation, an I-control calculation and a D-control calculation to said steering wheel return control gain, and calculates said steering wheel return control gain that is limited by means of said vehicle speed gain and said steering torque gain.

2. The electric power steering apparatus according to claim 1, wherein said angular acceleration gradually decreases as said steering angle becomes larger using said vehicle speed as a parameter.

3. The electric power steering apparatus according to claim 2, wherein said angular acceleration has a characteristic of decreasing as said vehicle speed becomes smaller.

4. The electric power steering apparatus according to claim 2, wherein said steering torque gain has a characteristic of being fixed until said steering torque is a predetermined value T1, gradually decreasing while said steering torque is larger than or equal to a predetermined value T2 (>said predetermined value T1) and smaller than or equal to a predetermined value T3 (>said predetermined value T2), and becoming 0 when said steering torque is larger than or equal to said predetermined value T3.

5. The electric power steering apparatus according to claim 2, wherein said vehicle speed gain has a characteristic of being fixed until said vehicle speed is a predetermined value V1, gradually increasing while said vehicle speed is larger than or equal to a predetermined value V2 (>said predetermined value V1) and smaller than or equal to a predetermined value V3 (>said predetermined value V2), and becoming a fixed value when said vehicle speed is larger than or equal to said predetermined value V3.

6. The electric power steering apparatus according to claim 2, wherein subtraction of said steering angle velocity through a phase advance filter from said target steering angle velocity is performed.

7. The electric power steering apparatus according to claim 2, wherein a maximum value of said steering wheel return control current is limited by a limiter.

8. The electric power steering apparatus according to claim 2, wherein the P-control calculation and the I-control calculation are performed to said steering wheel return control gain.

9. The electric power steering apparatus according to claim 1, wherein said steering torque gain has a characteristic of being fixed until said steering torque is a predetermined value T1, gradually decreasing while said steering torque is larger than or equal to a predetermined value T2 (>said predetermined value T1) and smaller than or equal to a predetermined value T3 (>said predetermined value T2), and becoming 0 when said steering torque is larger than or equal to said predetermined value T3.

10. The electric power steering apparatus according to claim 9, wherein said vehicle speed gain has a characteristic of being fixed until said vehicle speed is a predetermined value V1, gradually increasing while said vehicle speed is larger than or equal to a predetermined value V2 (>said predetermined value V1) and smaller than or equal to a predetermined value V3 (>said predetermined value V2), and becoming a fixed value when said vehicle speed is larger than or equal to said predetermined value V3.

11. The electric power steering apparatus according to claim 9, wherein subtraction of said steering angle velocity through a phase advance filter from said target steering angle velocity is performed.

12. The electric power steering apparatus according to claim 9, wherein a maximum value of said steering wheel return control current is limited by a limiter.

13. The electric power steering apparatus according to claim 9, wherein the P-control calculation and the I-control calculation are performed to said steering wheel return control gain.

14. The electric power steering apparatus according to claim 1, wherein said vehicle speed gain has a characteristic of being fixed until said vehicle speed is a predetermined value V1, gradually increasing while said vehicle speed is larger than or equal to a predetermined value V2 (>said predetermined value V1) and smaller than or equal to a predetermined value V3 (>said predetermined value V2), and becoming a fixed value when said vehicle speed is larger than or equal to said predetermined value V3.

15. The electric power steering apparatus according to claim 14, wherein subtraction of said steering angle velocity through a phase advance filter from said target steering angle velocity is performed.

16. The electric power steering apparatus according to claim 14, wherein a maximum value of said steering wheel return control current is limited by a limiter.

17. The electric power steering apparatus according to claim 14, wherein the P-control calculation and the I-control calculation are performed to said steering wheel return control gain.

18. The electric power steering apparatus according to claim 1, wherein subtraction of said steering angle velocity through a phase advance filter from said target steering angle velocity is performed.

19. The electric power steering apparatus according to claim 1, wherein a maximum value of said steering wheel return control current is limited by a limiter.

20. The electric power steering apparatus according to claim 1, wherein the P-control calculation and the I-control calculation are performed to said steering wheel return control gain.

* * * * *